Jan. 9, 1934.   F. H. KASPERSON   1,942,709
SELF JUSTIFYING BEAM SCALE
Filed June 10, 1932   2 Sheets-Sheet 1
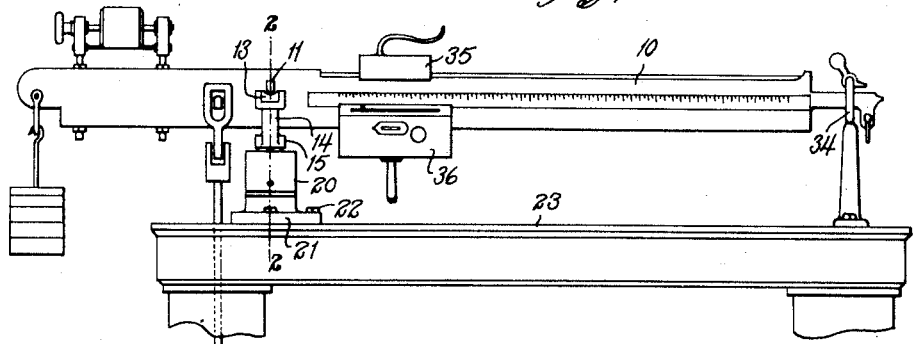
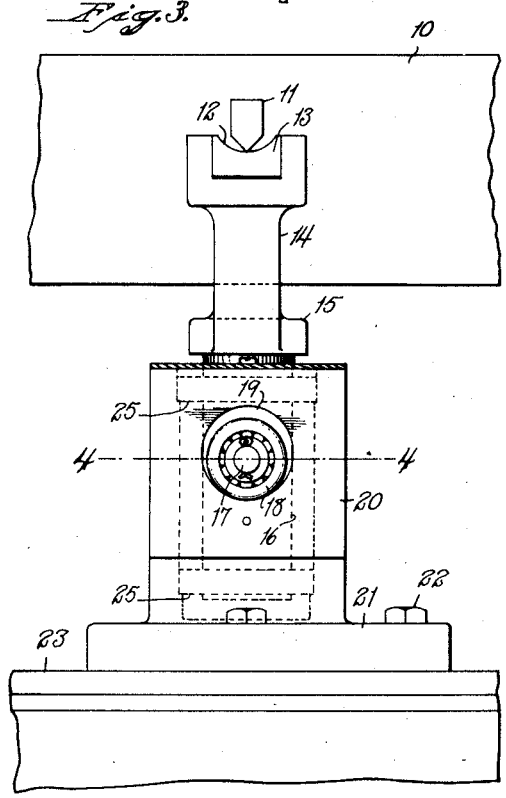
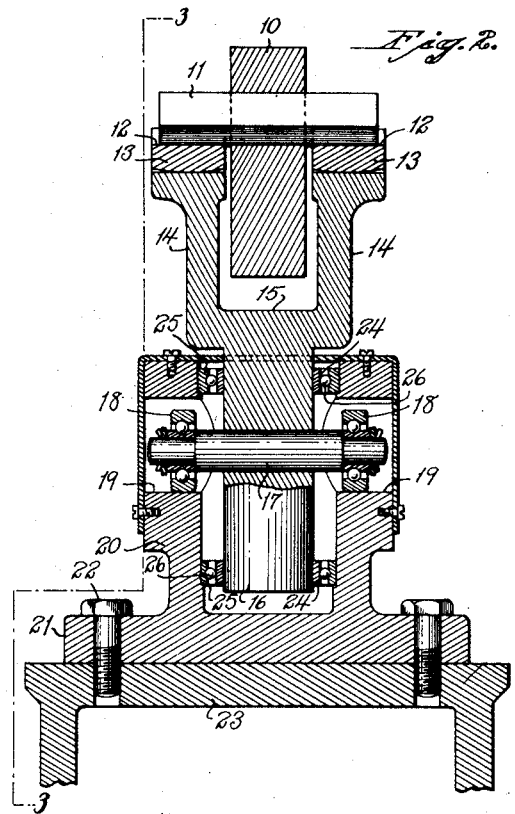
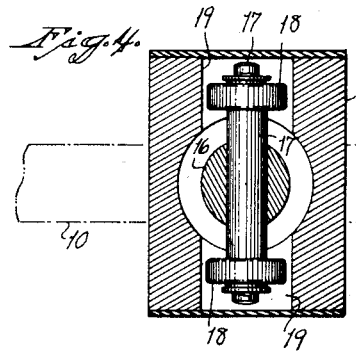
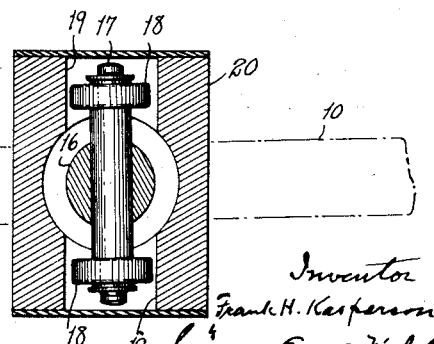

Jan. 9, 1934.  F. H. KASPERSON  1,942,709
SELF JUSTIFYING BEAM SCALE
Filed June 10, 1932  2 Sheets-Sheet 2
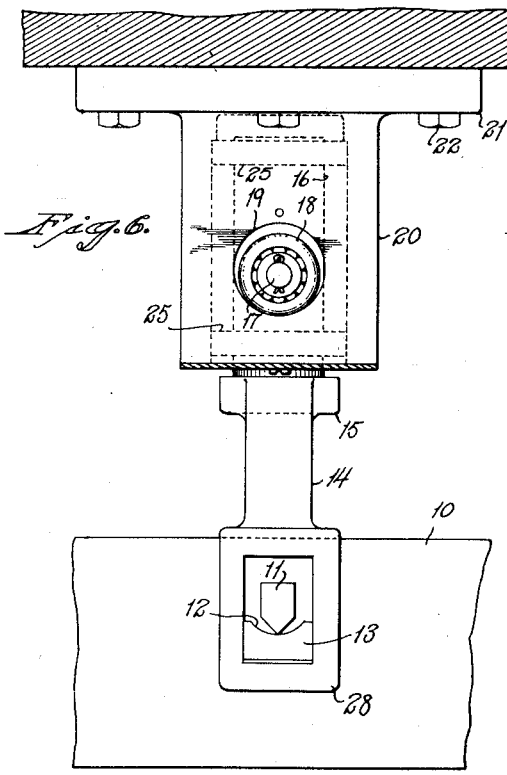
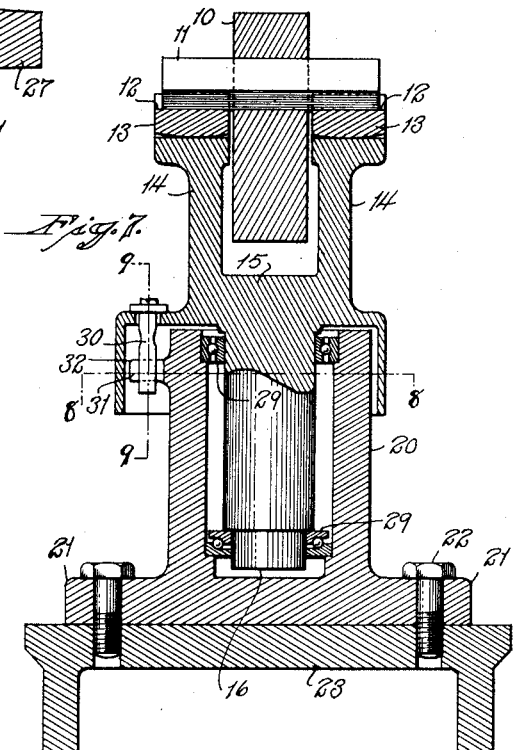
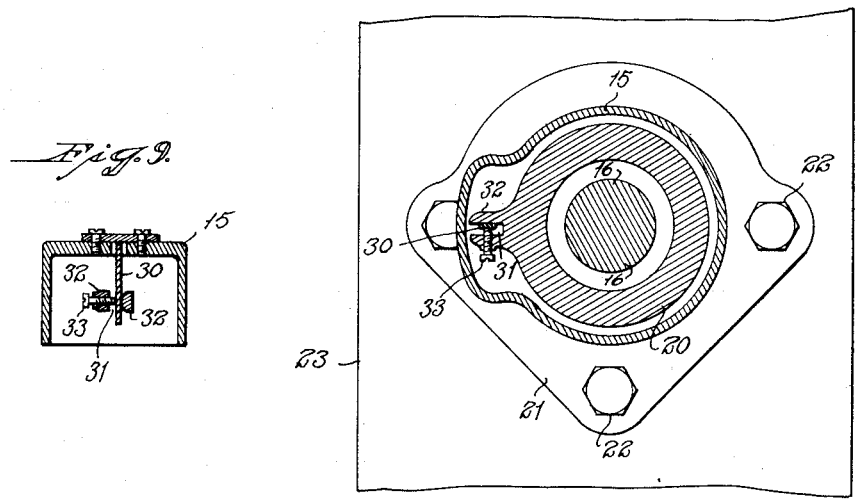

Patented Jan. 9, 1934

1,942,709

UNITED STATES PATENT OFFICE 1,942,709

SELF-JUSTIFYING BEAM-SCALE

Frank Henrey Kasperson, New Haven, Conn.

Application June 10, 1932. Serial No. 616,417

8 Claims. (Cl. 265—49)

My invention relates to an improvement in beam-scales, the object being to produce a simple, durable and reliable scale of the character described in which the beam is rendered self-justifying in the sense that it is automatically restored to its predetermined lateral position in case it is laterally deflected and its true balance destroyed with the effect of markedly reducing its sensitiveness as a weighing instrument, whereby, without the knowledge of the user, it is caused to indicate weights far in excess of the article being weighed, due to the effect of utilizing a substantial amount of the gross weight in returning the beam to its predetermined weighing position.

With these ends in view, my invention consists in the combination with a vertically-oscillating beam, subject to lateral deflection from its true weighing position; of a beam-support to which the said beam is pivoted for vertical oscillation; and automatic centering-means normally acting to yieldingly hold the said beam in a substantially-definite lateral position and acting also to restore the said beam to such position when laterally deflected therefrom.

My invention further consists in a self-justifying beam-scale having certain details of construction as will be hereinafter described and pointed out in the claims.

In the accompanying drawings:

Fig. 1 is a view in side elevation of a platform scale embodying my invention;

Fig. 2 is a vertical sectional view on the line 2—2 of Fig. 1;

Fig. 3 is a sectional view on the line 3—3 of Fig. 2;

Fig. 4 is a view in transverse section on the line 4—4 of Fig. 3;

Fig. 5 is a similar view showing the position of the parts when the beam is laterally deflected;

Fig. 6 is a view corresponding to Fig. 3 but showing my invention applied to a beam-scale of the suspension type;

Fig. 7 is a view generally corresponding to Fig. 2 but showing a modified form of my improvement, in which the automatic return of the beam to its predetermined lateral position is effected by a spring, rather than by gravity;

Fig. 8 is a sectional view on the line 8—8 of Fig. 7; and

Fig. 9 is a sectional view on the line 9—9 of Fig. 7.

In Figs. 1 to 6 inclusive, I have shown my invention embodied in a platform scale of the usual type, having a beam 10 pivoted for vertical oscillation on a knife-edge pivot 11 passing laterally through it and having the knife-edges of its ends normally resting in the true center of a semicircular centering-recess 12 in the upper face of a horizontal hardened bearing-block 13 mounted in the upper ends of the arms 14 of a yoke 15 having a horizontally rotatable stem 16 provided with a transverse bearing-pin 17, the respective projecting ends of which are furnished with ball-bearing centering-rollers 18 located in circular bearing-seats 19 of larger diameter than the said rollers and formed in the opposite side walls of a mounting-stand 20 having a foot 21 by which it is firmly secured by bolts 22 to the beam-shelf or table 23 of the scale. Under the construction described, the knife-edge pivot 11, instead of moving out of its true position in the center of the recess 12 and bearing-block 13, as shown in Fig. 3, and climbing, so to speak, the side-walls of the centering-recess 12 and so wearing and deforming the knife-edges of the pivot 11, the yoke 15 will be turned slightly in one direction or the other, causing its rollers 18 to ride upon the lower walls of the circular roller-bearing-seats 19 in the mounting-stand 20. Then, as soon as the influence, whatever it may be, tending to laterally deflect the beam from its true weighing position has been removed, gravity will cause the rollers 18 to ride down to the dead center or lowest point in the bearing-seats 19, whereby the beam will be returned to its predetermined correct position and thus automatically justified, so that in case of any deflection, however slight, of the beam, it will automatically be returned to its true position of maximum sensitiveness and so justified.

To facilitate the restoration of the yoke to its predetermined normal position after any lateral deflection of the beam 10, the stem of the yoke is provided at its upper and lower ends with ball-bearings consisting of inner raceways 24 secured directly to it, outer raceways 25 and interposed balls 26. Of these two raceways, only the outer raceways 25 are grooved for the reception of the balls 26, so as to provide for the slight vertical movement of the yoke incident to the riding of the rollers 18 upon the side-walls of the circular bearing-openings 19.

Under the construction described and through the intermediary of the yoke 15 and its bearings, the beam will normally be held in a substantially-definite predetermined lateral position and restored thereto when deflected therefrom, as frequently occurs in the practical use of such beam-scales.

In Fig. 6 I have shown the intermediary justifying means already described as applied to a beam-scale in which the mounting-stand 20 has its foot 21 bolted to a ceiling-beam such as 27, the principle of operation being precisely the same. The arms 14 of the yoke 15 are replaced by a square box 28 enclosing the bearing-block 13 for the knife-edge pivot 11.

In the modified construction shown by Figs. 7 to 9 inclusive, the yoke 15 has arms 14 and a stem 16 furnished with ball-bearings 29 at its upper and lower ends to reduce the friction of its turning movement. In this construction the yoke 15 is provided with a spring 30 entering a slot 31 in a boss 32 offsetting from the mounting-stand 20 and carrying a screw 33 by which the spring is held in place. Now if the beam 10 is laterally deflected, the yoke 15 will be correspondingly turned in one direction or the other and the spring 30 will be flexed so that when the force, whatever it is, tending to deflect the beam has been removed, the spring will immediately assert itself to rotate the yoke and thus return the beam to its predetermined normal position of sensitiveness and readiness for any weighing operation without utilizing an undetermined percentage of the weight of the article being weighed to restore the beam 10 to its true center before it begins to register as a weighing instrument.

By my invention, whereby the lateral position of the beam of a beam-scale is automatically justified by which I mean restored to its predetermined normal weighing position, I eliminate those sources of friction which operate to destroy the accuracy of beam-scales in general, the friction in question being caused in the main by the wearing of the knife-edge of the beam-pivot, as well as by the engagement of the outer end of the beam with the sides of the trig loop 34, a source of much inaccuracy in weighing by beam-scales. As shown, the scale is provided with the usual poise 35, and the printing or weight-recording accessory 36, which, as used, is responsible for the untoward lateral deflection of the beam 10 from its true or correct weighing position. In the embodiments herein shown of my invention, the bearing-blocks 13 are to be viewed as constituting the ultimate beam-support of the mechanism, irrespective of the particular means for mounting such beam-supports.

I claim:

1. In a self-justifying beam-scale, the combination with a vertically-oscillating beam subject to lateral deflection; of a knife-edge pivot therefor; a centering-inducing bearing for the said pivot; a horizontally rotatable yoke mounting for the said bearing and having a stem; a pin passing laterally through the stem; rollers mounted upon the ends of the pin; and means for mounting the yoke, including circular bearing-seats for the said rollers and of larger diameter than the same, whereby the action of gravity in centering the rollers upon the said circular bearing-seats thereof turns the yoke into its predetermined position when deflected therefrom by the lateral deflection of the said beam.

2. In a self-justifying beam-scale, the combination with a vertically-oscillating beam subject to lateral deflection; of a knife-edge pivot therefor; a centering-inducing bearing for the said pivot; a horizontally rotatable yoke having a stem; a pin passing through the said stem; rollers mounted upon the projecting ends of the pin; a stand for the yoke provided with circular bearing-seats larger in diameter than the said rollers which tend by gravity to center themselves in the said seats to restore the yoke to its predetermined position in case it is deflected therefrom by the lateral deflection of the beam; and means permitting the axial as well as the rotary movement of the said yoke.

3. In a self-justifying beam-scale, the combination with a yoke rotatable in the horizontal plane and having two complementary arms and a stem, pivot-bearings carried by the respective arms of the said yoke, a beam entered between the said arms, pivots carried by the beam, projecting from the opposite faces thereof and resting upon the respective pivot-bearings, a yoke-support, and automatic means interposed between the said yoke and yoke-support for turning the yoke into its predetermined position when the beam is deflected from its predetermined position of maximum sensitiveness.

4. In a self-justifying beam-scale, the combination with a yoke rotatable in the horizontal plane and having two complementary arms and a stem, pivot-bearings carried by the respective arms of the said yoke, a beam entered between the said arms, pivots carried by the beam, projecting from the opposite faces thereof and resting upon the respective pivot-bearings, a yoke-support receiving the stem of the yoke, and automatic gravity means interposed between the said yoke and yoke-support for turning the yoke into its predetermined normal position when the beam is deflected from its predetermined position of maximum sensitiveness.

5. In a self-justifying beam-scale, the combination with a yoke rotatable in the horizontal plane and having two complementary arms and a stem, pivot-bearings carried by the respective arms of the yoke, a beam entered between the said arms, pivots carried by the beam, projecting from the opposite faces thereof and resting upon the said pivot-bearings, a stand for receiving the stem of the yoke, a pin passing laterally through the said stem of the yoke, means coacting with the ends of the pin and the yoke-support for automatically turning the yoke into its predetermined normal position when the beam is deflected from its predetermined position of maximum sensitiveness, and antifriction bearings interposed between the stem of the yoke and the yoke-support for permitting the axial movement of the stem in addition to its rotary movement.

6. In a self-justifying beam-scale, the combination with a vertically-oscillating beam subject to lateral deflection, of pivots therefor, bearings for the said pivots, a horizontally-rotatable support for the said pivot-bearings, means for mounting the said rotatable support, and automatic means interposed between the said rotatable support and the means for mounting the same, for restoring the said support to its predetermined normal position when it is turned by the deflection of the beam.

7. In a self-justifying beam-scale, the combination with a vertically-oscillating beam subject to lateral deflection, of pivots therefor, bearings for the respective pivots, a rotatable yoke carrying the said pivot-bearings, means for mounting the said yoke, and automatic means interposed between the said yoke and the means for mounting it for turning it to restore it to its predetermined normal position when it is turned by the deflection of the beam.

8. In a self-justifying beam-scale, the combination with a vertically-oscillating beam subject to lateral deflection, of pivots therefor, bearings for the said pivots, a rotatable yoke mounting said bearings and provided with a stem, means for mounting the said rotatable yoke, and automatic means connected with the yoke for turning the yoke into its predetermined normal position and thus compensating for the deflection of the beam.

FRANK HENREY KASPERSON.